(12) United States Patent
Pociu

(10) Patent No.: US 7,107,279 B2
(45) Date of Patent: Sep. 12, 2006

(54) RAPID DEVELOPMENT IN A DISTRIBUTED APPLICATION ENVIRONMENT

(75) Inventor: David Pociu, Waterbury, CT (US)

(73) Assignee: InsiTech Group, Inc., Cheshire, CT (US)

( * ) Notice: Subject to any disclaimer, the term of this patent is extended or adjusted under 35 U.S.C. 154(b) by 488 days.

(21) Appl. No.: 10/024,961

(22) Filed: Dec. 19, 2001

(65) Prior Publication Data
US 2002/0107917 A1    Aug. 8, 2002

Related U.S. Application Data

(60) Provisional application No. 60/257,212, filed on Dec. 20, 2000.

(51) Int. Cl.
G06F 17/30 (2006.01)
G06F 17/00 (2006.01)

(52) U.S. Cl. .................................. 707/102; 707/101

(58) Field of Classification Search ............... 707/10, 707/104.1, 102, 103 R; 345/764; 709/201, 709/207, 219, 227, 203, 217; 717/108, 126
See application file for complete search history.

(56) References Cited

U.S. PATENT DOCUMENTS 6,012,098 A    1/2000  Bayeh et al.
6,076,092 A    6/2000  Goldberg et al.
6,269,373 B1 *  7/2001  Apte et al. .................... 707/10

FOREIGN PATENT DOCUMENTS

WO        00/56033        9/2000

OTHER PUBLICATIONS

BEA, BEA WebLogic Server 5.1 documentation, Feb. 9, 2000, pp. 1-23.*
WebLogic Server Documentation, BEA, Last updated Feb. 9, 2000, pp. 1-31.*
H.A. Jacobsen, Middleware for Software Leasing over the Internet, 1999 ACM, pp. 1-9.*
Vassilis Christophides et al., "On Wrapping Query Languages and Efficient XML Integration", International Conference on Management of Data, vol. 29, No. 2, May 16-18, 2000, pp. 141-152.

* cited by examiner

Primary Examiner—Apu Mofiz
(74) Attorney, Agent, or Firm—Fish & Richardson P.C.

(57) ABSTRACT

A method in a distributed application environment is provided. The method includes, in a network, encapsulating data requests generated by an application in a first system, transferring the encapsulated data requests to a second system, executing the encapsulated data requests in the second system, and processing in the first system responses generated by the encapsulated data requests in the second system.

15 Claims, 7 Drawing Sheets

RAPID DEVELOPMENT IN A DISTRIBUTED APPLICATION ENVIRONMENT

CLAIM OF PRIORITY

This application claims priority under 35 USC §119(e) to U.S. patent application Ser. No. 60/257,212, filed on Dec. 20, 2000, the entire contents of which are hereby incorporated by reference.

TECHNICAL FIELD

This invention relates to rapid development in a distributed application environment.

BACKGROUND

There is a need to interact with applications over the Internet. The development of web browsers aided this need. For example, a web browser sends a Hyper Text Markup Language (HTML) request to a web server via Hyper Text Transfer Protocol (HTTP). The web server receives the request and routes it to an appropriate database via an Open Database Connection (ODBC). Active Server Pages (ASP) or Java Scripts are used on the web server to translate and determine location and routing of the HTML requests and responses from the application database. The responses are translated into an HTML web page and sent back to the web browser using HTTP.

Application servers speed up the access to application databases. Servlets or enterprise java beans (EJB) reside on the application server and are "hardcoded" to make specific database calls. The requests from the application server are made through Java Database Connections (JDBC).

SUMMARY

In an aspect, the invention features a method including in a network, encapsulating data requests generated by an application in a first system, transferring the encapsulated data requests to a second system, executing the encapsulated data requests in the second system, and processing in the first system responses generated by the encapsulated data requests in the second system.

Embodiments may include one or more of the following. Encapsulating may include generating an Extensible Markup Language (XML) structure for each data request, and converting the XML structure to an XML request. The XML structure may include a variable stream of data stored in memory of the first system, the stream including an XML element for each request. The XML element may be a class object whose data is stored to generate XML. The XML element may include data from a data set object. The data set object may include table dictionaries, column names and data from record sets, and stored procedure parameters.

Transferring may include a text transmission protocol and the test transmission protocol may be Hypertext Transfer Protocol.

Executing may include de-encapsulating the encapsulated data requests by parsing into request statements, and executing the request statements. The method may also include translating responses from the executed request statements into an XML format, and sending the XML formatted responses to the first system.

In another aspect, the invention features a distributed application method including converting application requests in a first system, transmitting the converted application requests to a second system over a network, parsing the converted application requests in the second system into request statements, and executing the request statements in the second system.

Embodiments may include one or more of the following. Converting may include generating a data structure for storing data and parameters related to an application that produced the application requests, translating the application requests into a standardized delimited data structure stored in a memory of the first system, and transforming the standardized delimited data structure in conjunction with the data structure into a stream of text based data utilizing a Extensible Markup Language (XML) format.

Parsing may include breaking down the converted application requests to an executable command format utilizing data and parameters related to an application.

Executing may also include evaluating executable commands prior to execution in the second system and/or evaluating results generated by the executable commands.

The method may also include converting the results into a stream of text based data in a standardized XML format, and transmitting the converted results over the network to the first system.

In another aspect, the invention features an application server method including generating a first data structure for storing data and parameters related to an application residing in the server, translating application requests from the application into a delimited second data structure stored in a memory, generating a stream of text-based data in an Extensible Markup Language (XML) format from the second data structure.

Embodiments may include one or more of the following. The first data structure may include database tables, procedure results from logic calls and status/error messages. The second data structure may include an element for each of the application requests and the element may be a class object.

In another aspect, the invention features a method including, in a server, receiving a stream of text-based data in an Extensible Markup Language (XML) format, parsing the stream into request statements, and executing each of the request statements.

Embodiments may include one or more of the following. Executing may also include intercepting the request statements prior to execution and applying additional logic based on a type or content of the request statements. Executing may also include applying additional logic to responses generated from executing the request statements.

The method may also include converting responses generated from each of the executed request statements into an XML format.

Embodiments of the invention may have one or more of the following advantages.

The method provides a computer software application with the ability to send and receive database requests over any type of computer network to and from multiple databases in a distributed application environment.

The method provides a computer software application with the ability to send and receive logic requests over any type of computer network in a distributed application environment, and automatically display, render and/or using the responses to the requests.

The method provides a technique for making each request/response sent over the network variable length so that it can contain multiple and different request/responses.

The method provides a technique for wrapping requests and responses into a format that is network independent.

The method is a technique for formatting data retrieved via a database request or logic call or some other method type in such a way that it can contain multiple records, logic call results and error messages that are easily accessible.

The technique provides for nesting or chaining the database and logic call methodology so that when a request is made from a client side of a computer application to a server side of the computer application, the server side can make its own requests and receive responses to other applications and/or databases, independent of their location in the same manner as the client side.

The method provides for setting up database relationships for Database Enabled Controls such as, for example, text boxes, drop down boxes, check boxes, and radio buttons, via property settings.

The technique allows a developer the ability to manipulate the retrieved data results in a method specific to the retrieved data format.

The technique provides for backward compatibility of the request/response structure so that when future request/response structures are added, they do not conflict with earlier versions of the response/request structure.

The technique provides for translating the requests into a structure/language understandable by the intended recipients (i.e. database, application logic, etc.).

Various programming languages can be used to implement the techniques described herein and accepted programming techniques are utilized in order to increase industry acceptance and maximize the adaptability and flexibility of the techniques.

The technique uses structured or modularized programming so that the addition of new functionality, request types, and action types is simplified.

The method extends the Server Application Interface to perform future actions not yet developed based on the XML requests passed to it. An example of an action being a "SELECT" statement for a database or an "execute" statement for computer code.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
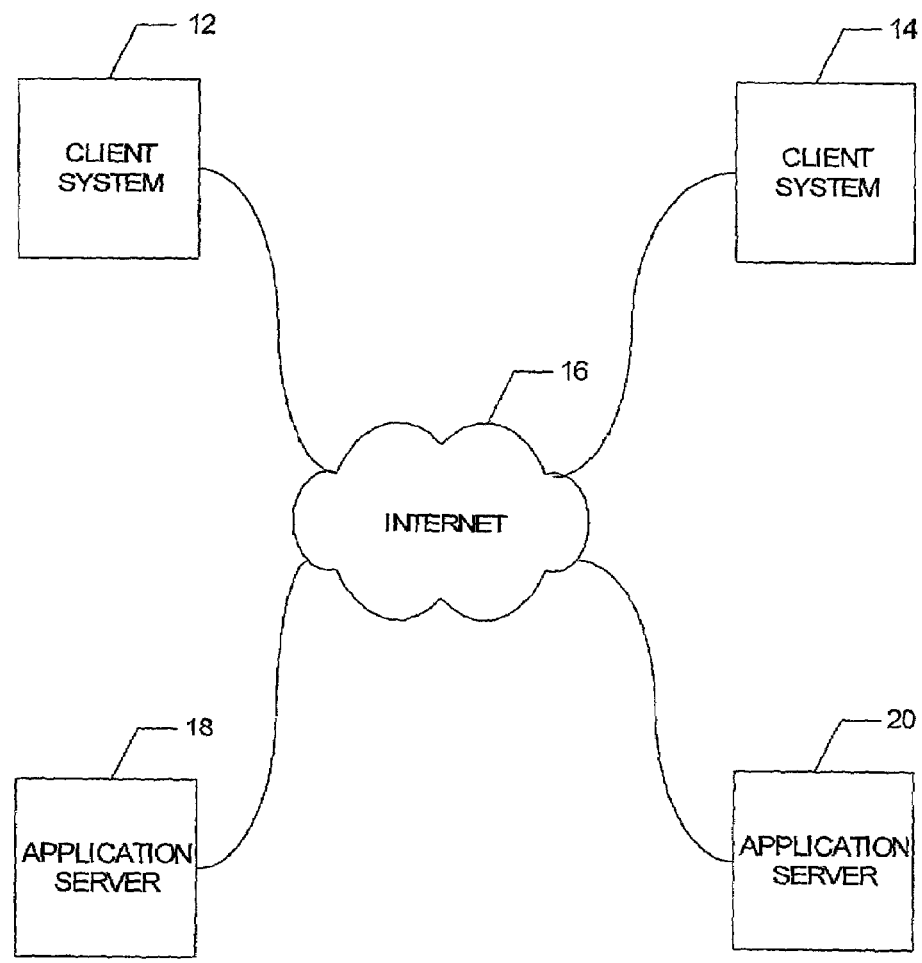
FIG. 1 is a block diagram of a distributed application environment.

Referring to FIG. 1, a distributed application environment 10 is shown. The environment 10 is a computing environment in which computer software applications are implemented or installed. The environment 10 includes user systems (also referred to as client systems) 12 and 14. Each of the user systems 12 and 14 is connected to a network of computers such as the Internet 16. Other networks may include, for example, local area networks (LANs), wide area networks (WANs), intranets, and wireless Internet. A server system 18 and a server system 20 are linked to the Internet 16. Server systems 18 and 20 are often referred to as application servers or database servers. An example server system is a web server such as an Apache web server (see http://www.apache.org). In general, the servers 18 and 20 each execute a computer program that provides services to other computer programs in the same or other computers, such as user systems 12 and 14. In a client/server programming model, each of the server systems 18 and 20 executes a program that awaits and fulfills requests from client programs in the same or other computers, such as the user systems 12 and 14. Fulfillment of a request is generally referred to as a response.

In the World Wide Web ("Web"), servers 18 and 20 are generally referred to as Web servers. A Web server uses the client/server programming model and the Web's Hypertext Transfer Protocol (HTTP) to serve files that form Web pages to Web users on user systems 12 and 14. The user systems 12 and 14 typically contain HTTP clients that forward the requests to the servers. Popular Web servers are, for example, Microsoft's Internet Information Server (IIS), which comes with the Windows NT server; Netscape Fast-Track and Enterprise servers; and Apache, a Web server for UNIX-based operating systems. Other example Web servers include Novell's Web Server for users of its NetWare operating system, and IBM's family of Lotus Domino servers.

Figure 2:
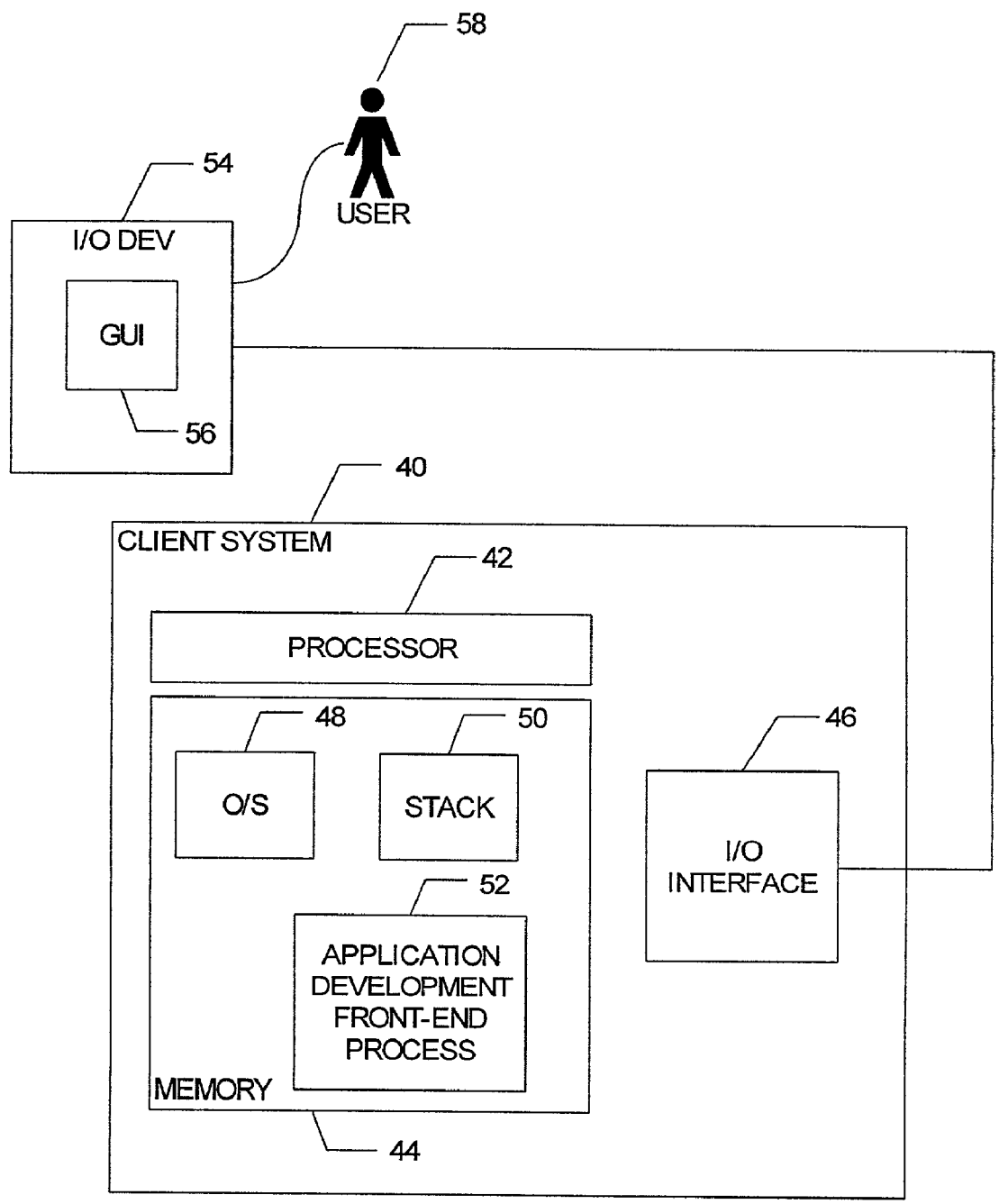
FIG. 2 is a block diagram of a user system.

Referring to FIG. 2, each of the user systems, user system 12 for example, includes a computer 40. The computer 40 is linked to the Internet 16 using TCP/IP (Transmission Control Protocol/Internet Protocol) or another suitable protocol. Computer 40 contains a processor 42, a memory 44 and an input/output (I/O) interface 46. Memory 44 stores an operating system ("OS") 48, a TCP/IP protocol stack 50 for communicating over network 16 and machine-executable instructions executed by processor 42 to perform an application development front-end process 52. Computer 40 may also include an input/output (I/O) device 54 linked to the I/O interface 46. The I/O device 54 may display a graphical user interface (GUI) 56 to a user 58. In other examples, the user 58 may interact with the I/O device 54 through a non-visual interface such as a programmatic interface (not shown).

In general, a GUI 56 is a graphical (rather than purely textual) user interface to a computer. The term came into existence because the first interactive user interfaces to computers were not graphical; they were text-and-keyboard oriented and usually included commands that had to be remembered and computer responses that were infamously brief. Elements of a GUI 56 include such things as: windows, pull-down menus, buttons, scroll bars, iconic images, wizards and the mouse. With the increasing use of multimedia as part of the GUI 56, sound, voice, motion video, and virtual reality interfaces become part of the GUI 56 for many applications. A system's graphical user interface (GUI) along with its input devices is sometimes referred to as its "look-and-feel." When creating an application, many object-oriented tools exist that facilitate writing a graphical user interface. Each GUI element is typically defined as a class widget from which one may create object instances for a specific application. One may code or modify prepackaged methods that an object will use to respond to user stimuli.

The GUI 56, when utilized, has its standard visual controls modified or extended so that the visual controls are "data enabled." A control is a GUI element such as a Text Field, List Box, Table, or Radio Button. A data enabled control is a standard GUI control that has properties added to it that describes its relationships to tables in a database. A data enabled control has properties describing the data relationships to the control and the locations of data and data sources that pertain to that control. These properties are set by a programmer and can be modified programmatically. Once the controls are extended, the ability to set and change the properties simplifies the process of mapping data to the data enabled controls. The key properties implemented to "data-enable" a control are a location of a database table, a name of the table, and a column name that the control is related to. Other properties may include, but are not limited to, the following information: a listing of table relationships; an indicator if the control is a key column in the table; an indicator if the control is a primary key column and if is part of a compound primary key; an indicator that sets whether the record is locked when in use, and an indicator if the data in the control has changed.

A non-visual interface is an interface of an application through which a developer writes computer software code that automatically interacts with other software based on certain pre-determined conditions or events. This computer software code can be either a single program/module or set of modules contained within an application or outside the application but with programmatic access to it. This computer software code is executed behind the scenes and is generally transparent to the user 58 and not requiring user input.

When a non-visual interface is incorporated, two types of interfaces may be present: a programmatic data request interface and a custom request interface. The programmatic data request process generates programmatic data request. The custom request interface generates a custom request that includes a stream of data formatted in Extensible Markup Language (XML).

XML is a flexible way to generate common information formats and share both the format and the data on the World Wide Web, intranets, and elsewhere. For example, computer makers might agree on a standard or common way to describe the information about a computer product (processor speed, memory size, and so forth) and then describe the product information format with XML. Such a standard way of describing data enables a user to send an intelligent agent (a program) to each computer maker's Web site, gather data, and then make a valid comparison. XML can be used by any individual or group of individuals or companies that wants to share information in a consistent way.

XML, a formal recommendation from the World Wide Web Consortium (W3C), is similar to the language of today's Web pages, the Hypertext Markup Language (HTML). Both XML and HTML contain markup symbols to describe the contents of a page or file. HTML, however, describes the content of a Web page (mainly text and graphic images) only in terms of how it is to be displayed and interacted with. For example, the letter "p" placed within markup tags starts a new paragraph. XML describes the content in terms of what data is being described. For example, the word "phonenum" placed within markup tags could indicate that the data that followed was a phone number. This means that an XML file can be processed purely as data by a program or it can be stored with similar data on another computer or, like an HTML file, that it can be displayed. For example, depending on how the application in the receiving computer wanted to handle the phone number, it could be stored, displayed, or dialed.

XML is "extensible" because, unlike HTML, the markup symbols are unlimited and self-defining. XML is actually a simpler and easier-to-use subset of the Standard Generalized Markup Language (SGML), the standard for how to create a document structure.

Figure 3:
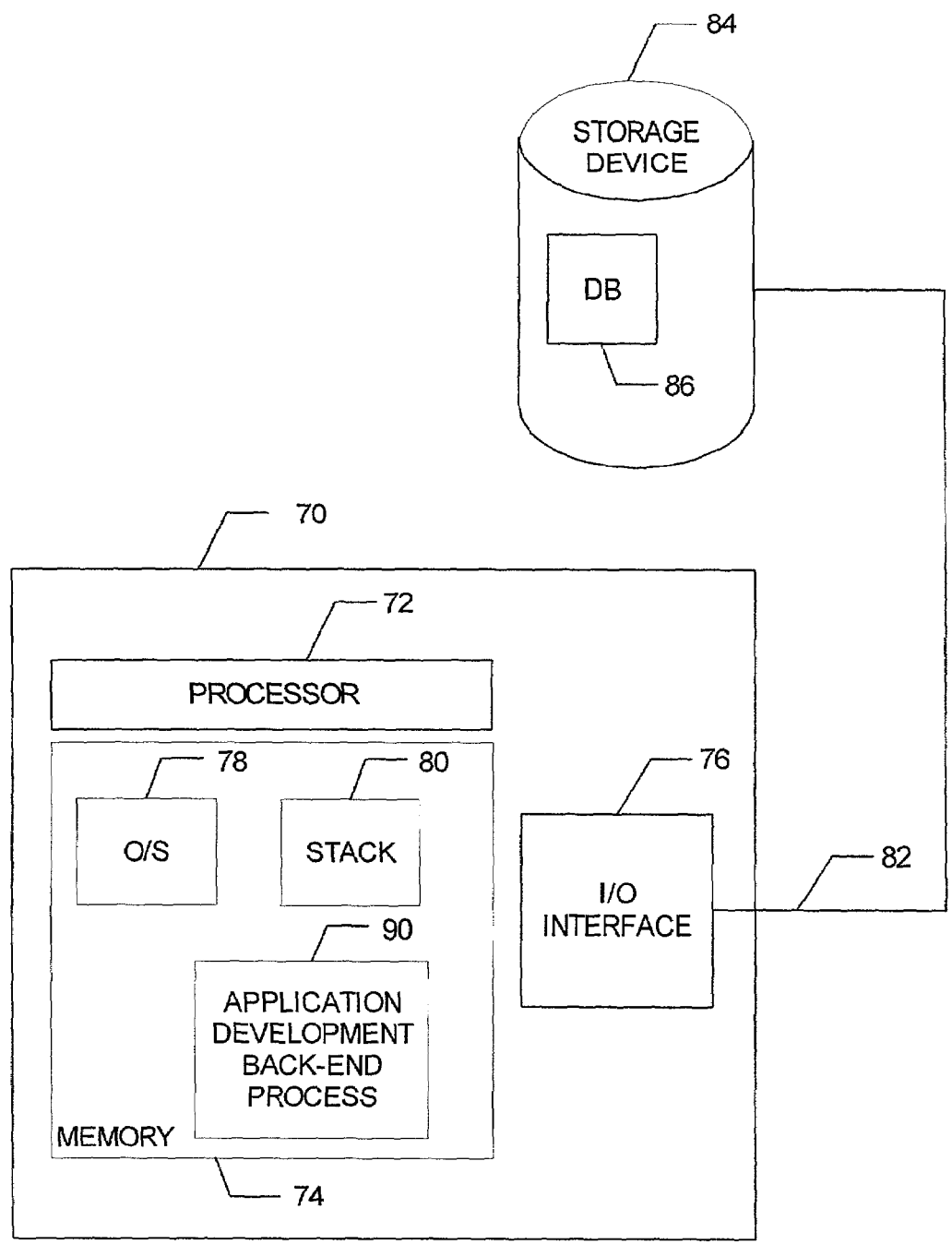
FIG. 3 is a block diagram of a server system.

Referring to FIG. 3, each of the server systems, server system 18 for example, includes a computer 70. The computer 70 is linked to the Internet 16 using TCP/IP (Transmission Control Protocol/Internet Protocol) or another suitable protocol. Computer 70 contains a processor 72, a memory 74 and an input/output (I/O) interface 76. Memory 74 stores an operating system ("OS") 78, a TCP/IP protocol stack 80 for communicating over network 16 and machine-executable instructions executed by processor 42 to perform an application development back-end process 90. Computer 40 includes a link 82 to a storage device 84. The storage device 84 includes one or more databases 86.

Figure 4:
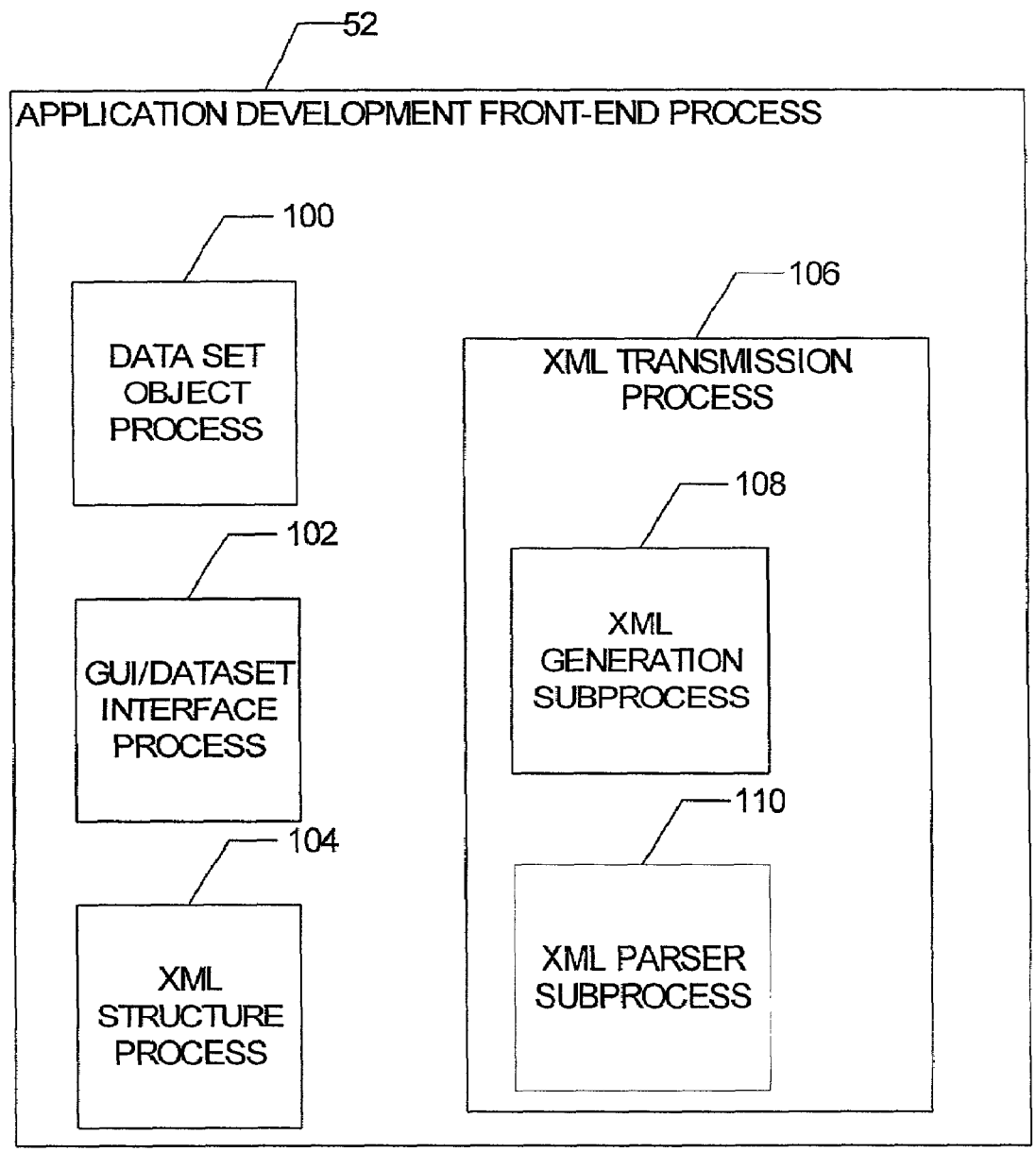
FIG. 4 is a diagram of the application development front-end process.

Referring to FIG. 4, the application development front-end process 52 of FIG. 2 includes data set object process 100, a GUI/data set interface process 102, an XML structure process 104 and an Extensible Markup Language (XML) transmission process 106. The XML transmission process 106 includes an XML generation subprocess 108 and an XML parser subprocess 110. The process 52 does not contain the GUI/data set interface process 102 when a non-visual interface is employed in a user system.

The data set object process 100 distributes received data into a data structure called a dataset object. The dataset object holds the data used for interacting with the GUI and non-visual interface, the data sources and/or application logic, i.e., the function of the dataset object is to house application data passed back and forth from the application development front-end process 52 and application development back-end process 90.

There are three basic types of information stored in the dataset object, although other types may be added as needed, i.e., information from database tables or record sets, stored procedure results from logic calls and status/error messages. The dataset object is structured in an object-oriented manner so that it is flexible and easily extended for different types of data structures.

In other examples, access to the dataset object may be obtained. For example, a subroutine can be written to access the data contained in the dataset object in order to manipulate it as necessary. Also, more than one dataset object may exist in the GUI/data set interface process 102.

The dataset object houses a dataset. The dataset may contain multiple record sets (one for each table/relation in the dataset, logic call or stored procedure results and error or status messages). For each record set in the dataset, there is a corresponding table dictionary or layout that contains a data structure of a database table from which that data comes from and a set of records or rows from a table that contains the actual data that includes fields or columns. The number of fields or columns depends upon the table layout/dictionary. Depending on the data source, the fields may contain data in any format specific to that data source. There can be multiple record sets in a dataset object, each with their own table layout and set of records. The flexible structure of the dataset allows for a user to implement logic that is specific to accessing that particular type of data. This functionality allows for the ability to manipulate any type of data from such varied sources as, for example, relational databases, object databases, LDAP directories and proprietary database formats.

In the stored procedure results object, the results of algorithm, subroutine, function, method or other logic calls are stored. The results are written to the dataset in the same structure as the subroutine produced them.

In the Status/Error Messages object the results of any status or error messages generated on the application development back-end process 90 are stored. The error messages may come from problems with accessing data in a database, custom generated error messages from validations and various other sources.

The dataset object is not limited to the storage of record sets, stored procedure results and status/error messages. The dataset object structure is expandable and new data types may be added in the future as they are developed. As these new data types are developed, the dataset structure can be modified to accommodate the new data required by the new data types. The structuring of the dataset in an object-oriented manner allows for this flexibility and ease of expansion and addition of new types.

The GUI/data set interface process 102 provides an interface between controls (not shown) in the GUI 56 and a dataset object. One purpose of the interface process 102 is to keep the controls of the GUI 56 and data in the dataset object process 100 synchronized. The GUI/dataset interface process 102 monitors the data-enabled controls of the GUI 56 for changes/updates. For example, anytime the focus of a control is changed or the "Return/Enter" key is depressed on a keyboard, a value contained in the control is checked against the corresponding piece of data in a dataset object. If the data is different, the dataset object updates its dataset. If the dataset object receives new data and the new data is different the data in the data-enabled controls of the GUI 56, the GUI/dataset interface process 102 updates the data-enabled GUI controls affected.

The GUI/dataset interface process 102 may also contain a series of functions and event triggers that can be accessed/implemented by a programmer to help manipulate the data in the data enabled controls, perform actions, execute application logic or make database calls. Some examples of common functions are: set the value of a control, get the current value of a control and set the focus to a control. Some common examples of event triggers are: a value of a control has changed and the control in focus has changed.

A series of functions are used to update and synchronize the data displayed in the data enabled GUI controls and the dataset object as well as trigger execution of some application logic. The programmer implements the event triggers in order to initiate actions or application logic based on certain criteria. Some examples of actions are the retrieving, updating, or deleting of a database record or the execution of some application logic on the application development back-end process 90.

The XML structure process 104 generates an XML structure in response to a request or action received from the data enabled GUI controls or via a programmatic request or action. An XML structure is a variable stream of data stored in memory that includes an XML Element for each request/action submitted. Each XML Element is a class object whose data is stored in such a way to allow easy generation of XML from the data. The delimited data in the XML structure contains parameters/data for carrying out requests/actions on the applications development back-end process 90. Depending on the request/action, an XML Element may contain data from a dataset object, such as table dictionaries, column names and data from the record sets, stored procedure parameters or other information.

The XML generation subprocess 108 in the XML transmission process 106 takes an XML structure from memory 44 and converts the XML structure into a stream of XML data referred to as an XML request by converting the delimiters in the XML structure into XML tags through a standard naming convention based on the delimiter and its location in the data. The XML transmission process 106 sends the XML Request across the network 16 (of FIG. 1) to the application development back-end process 90 using a text transmission protocol such as Hypertext Transfer Protocol (HTTP). Included in the transmitted stream of data are the application server location/name and the application development back-end process 90 so the stream may be routed properly in the event that multiple application development back-end processes are implemented in a single server or multiple servers in the network 10 contain application development back-end processes.

Figure 5:
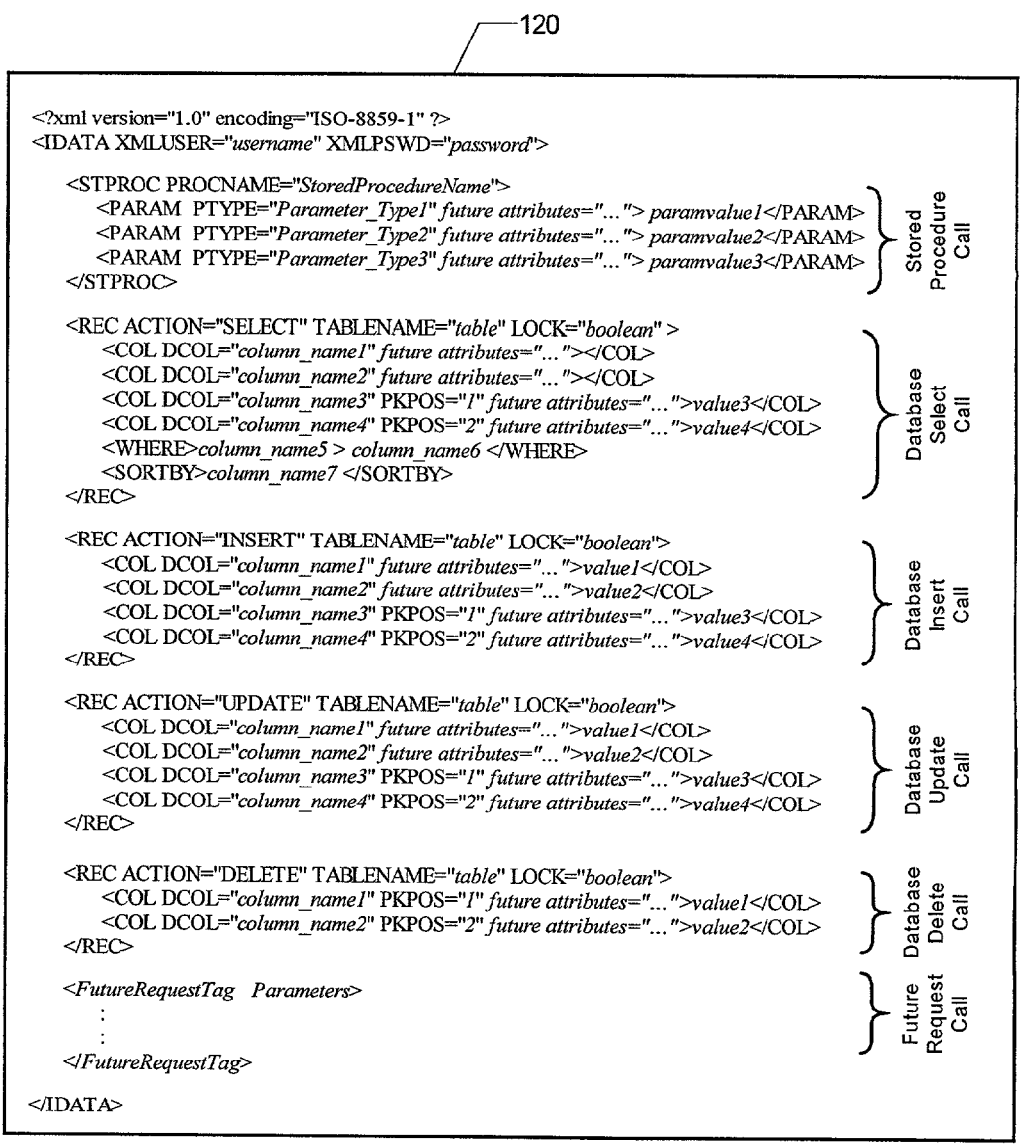
FIG. 5 illustrates a general format of an XML request.

Referring to FIG. 5, a general format 120 of an XML request is shown. The naming of the tags in FIG. 5 is arbitrary and may be changed to fit any naming convention. The format 120 is shown with two types of actions or requests, i.e., a stored procedure or program logic call and a database call. The logic call is defined by the <STPROC> . . . </STPROC> XML identifier tags and the database call is defined by the <REC> . . . </REC> XML identifier tags. These tags are used for illustration purposes. As long as the structure is maintained, the nomenclature for the XML tags is irrelevant. It is recommended that standard naming convention be adopted for ease of development.

The database calls 120 are illustrated with four different variations delimited by the <ReC></REC> tags depending on what interaction is needed with the database. This is accomplished by adding a different parameter or action to the initial <REC></REC> tags for each request. These parameters are shown as an example, other parameters and tags would be added to define various other database calls required by different databases. The same is true for the stored procedure calls. Additional functionality or access to various programming structures and languages can be gained by changing the parameter types or by adding new tags. This flexible structure allows not only for the expansion of existing requests but also for the addition of new and different requests as newer technology and requirements come to light. For example, as wireless computer devices become more standardized, an additional call type can be added to the XML Request structure for accessing these devices by assigning a new set of XML tags that would be structured toward the devices parameter/data requirements. This new call type would then be added to the XML structure process 104 to execute the requests.

Figure 6:
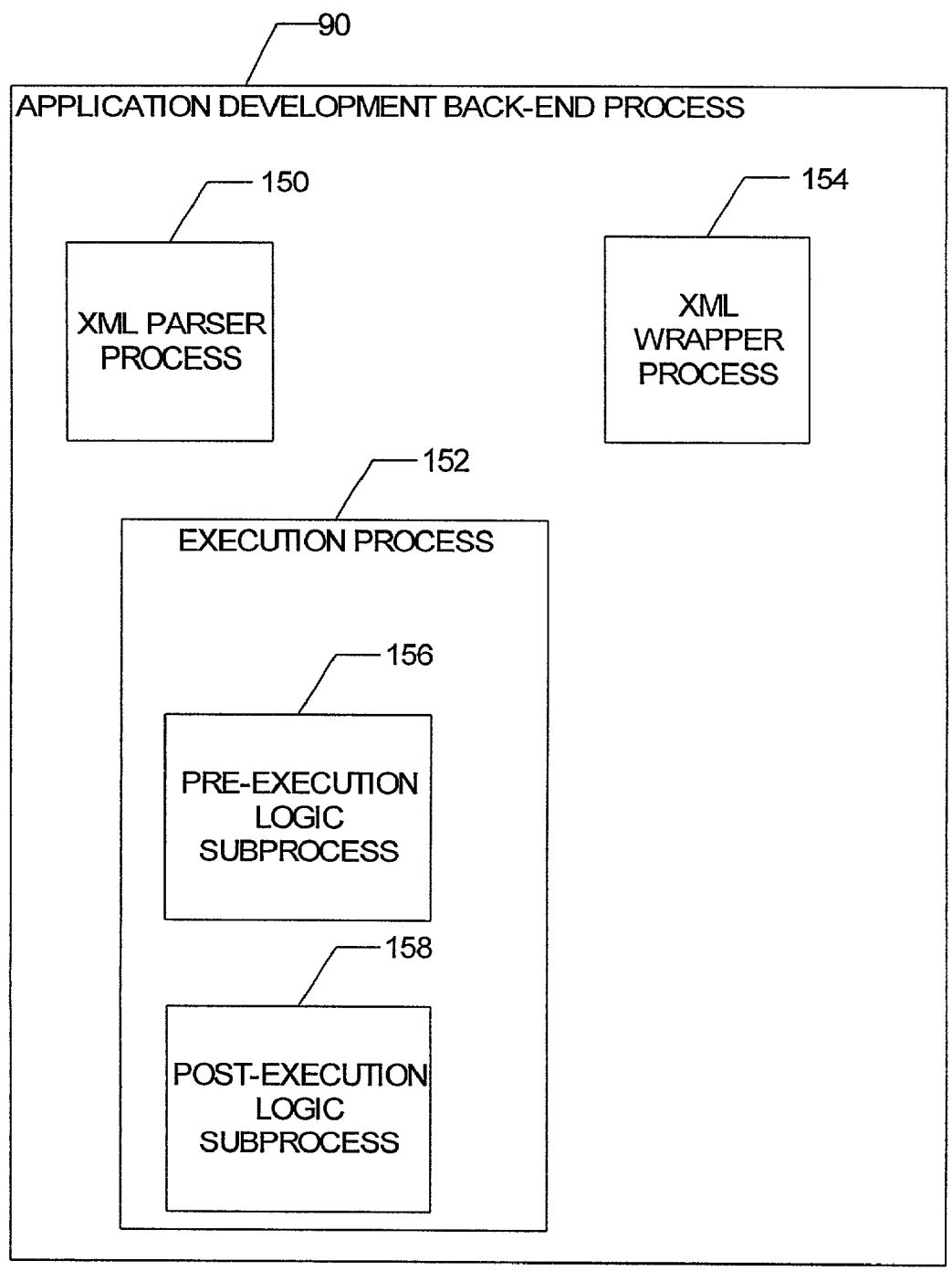
FIG. 6 is a diagram of the application development back-end process.

Referring to FIG. 6, the application development back-end process 90 includes an XML parser process 150, an execution process 152 and an XML wrapper process 154. The execution process 152 includes a pre-execution logic subprocess 156 and a post-execution logic subprocess 158.

The XML parser process 150 receives the stream of XML requests and parses the stream into request statements with the proper syntax that the intended database/data source, logic and/or other recipient can understand. The request statements are generated based on the parameters and data contained within the XML stream. As various request types are added, the XML Parser process 150 can be updated to handle the parsing of the new types without disruption.

The execution process 152 receives the request statements from the XML parser process 150 in the pre-execution logic subprocess 156. One function of the execution process 152 is to execute the request statements and receive any responses to those requests. The pre-execution logic subprocess 156 gives the execution process 152 a chance to perform additional logic based on the type or content of the request statements. The request statements can be modified or canceled in the pre-execution logic subprocess 156.

When the pre-execution logic subprocess 156 is complete request statements are executed in the execution process 152 by sending the request statements to the intended database/data source, logic or other recipient. The execution and processing of the request statements may entail data retrieval, manipulation, calculations, and/or execution of additional logic, before a response is returned. There are different methods for executing the statements depending on the request types and the programming languages used. The results of executing the request statements, if any, are returned to the execution process 152 along with any status and/or error messages generated by the requests.

The post-execution logic subprocess 158 gives the execution process 152 a chance to perform additional logic based on the type or content of the responses. When the post-execution logic subprocess 158 is complete the responses are sent to the XML wrapper process 154.

The XML Wrapper process 154 takes the responses or results and translates them back into XML in the form of a XML response utilizing a specific XML format. These responses are returned to the application development front-end process 52 across the network 16.

Figure 7:
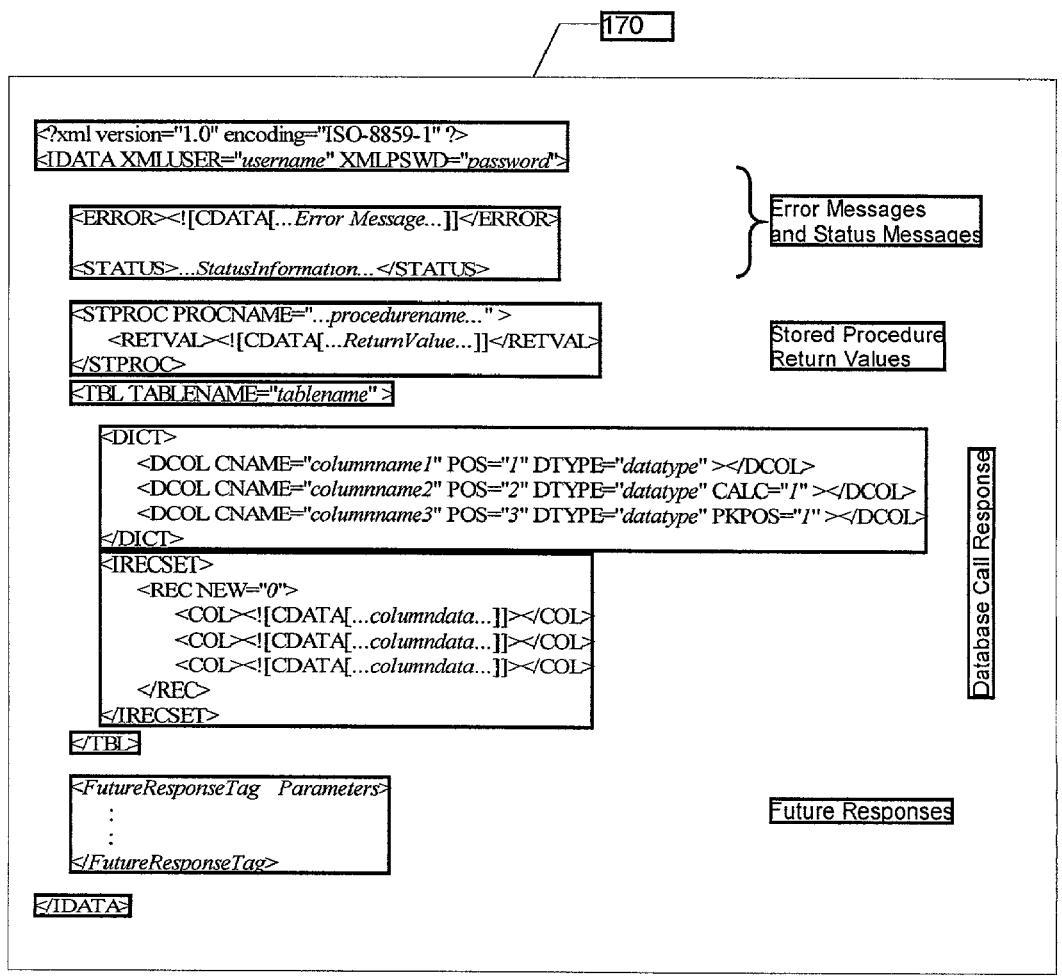
FIG. 7 illustrates a general format of an XML response.

Referring to FIG. 7, a general format 170 of an XML response is shown. The naming of the tags in the figure is arbitrary and can be changed to fit any naming convention. The format 170 is shown with four types of responses: error messages, status messages, stored procedures/program logic results and database results. The error messages are defined by the <ERROR> </ERROR> tags, the status messages are defined by the <STATUS> </STATUS> tags, the stored procedure results are defined by the <STPROC> </STPROC> tags, and the database results are defined by the <TBL> </TBL> tags.

Within the main tags are sub-tags. The parameters and tags are arbitrary and used for illustration purposes. As long as the format 170 is maintained, the nomenclature for the XML tags is irrelevant. Other parameters and tags may be added to define various other response types.

The XML response is received by the XML parser subprocess 110 of the XML transmission process 106 in the application development front-end process 52. The XML parser subprocess 110 takes the responses or results and, based on where the original request originated, parses the data out and case inserts the data into the proper dataset of the dataset object. The placement of the data in the dataset is based on the XML tag structure. Based on where the original request originated, the appropriate logic is notified by the dataset object that makes use of the data. If the originator of the request was the GUI 56 then the GUI/dataset interface process 102 evaluates the data in the appropriate dataset object and updates the GUI controls as necessary.

A number of embodiments of the invention have been described. Nevertheless, it will be understood that various modifications may be made without departing from the spirit and scope of the invention. For example, a first application development front-end process may interface with one or more other application development front-end processes in a single or multiple servers. This chaining of application development front-end processes provide multiple levels of data and application access and interaction. Accordingly, other embodiments are within the scope of the following claims.

What is claimed is:

1. A computer-implemented method comprising
displaying a control in a graphical user interface;
receiving a data request generated by an application executing on a first system;
generating an Extensible Markup Language (XML) structure for the data request;
the XML structure including a variable stream of data stored in a memory of the first system, the stream including an XML element for the request, the XML element including data from a data set object;
transferring the XML structure to a second system;
receiving a response from the second system;
updating the data set object based on the response; and
changing the value of the control based on the updated data set object.

2. The method of claim 1 in which the XML element is a class object whose data is stored to generate XML.

3. The method of claim 1 in which the data set object includes table dictionaries, column names and data from record sets, and stored procedure parameters.

4. The method of claim 1, wherein transferring the XML structure comprises using a text transmission protocol.

5. The method of claim 4, in which the text transmission protocol is Hypertext Transfer Protocol (HTTP).

6. The method of claim 1, further comprising:
parsing the XML structure into request statements; and
executing the request statements.

7. The method of claim 6 further comprising:
translating responses from the executed request statements into an XML format; and
sending the XML formatted responses to the first system.

8. A computer-implemented method for implementing a distributed application protocol, the method comprising:
displaying a control in a graphical user interface;
receiving an application request from an application in a first system;
translating the application request into a data structure, the data structure being a standardized delimited data structure stored in a memory of the first system, and
transforming the data structure into a stream of text based data utilizing an Extensible Markup Language (XML) format;
transmitting the stream of text to a second system over a network, transmitting causing the second system to execute an executable command;
receiving a response in the first system;
updating a data set object based on the response; and
changing the value of the control based on the updated data set object.

9. The method of claim 8, further comprising:
causing the second system to parse the stream of text by breaking down the stream of text to an executable command format utilizing data and parameters related to an application.

10. The method of claim 9, further comprising causing the second system to evaluate the executable command prior to execution in the second system.

11. The method of claim 10, further comprising causing the second system to evaluate a result generated by executing the executable commands.

12. The method of claim 11 further comprising:
causing the second system to convert a result into a stream of text based data in a standardized XML format; and
transmitting the result over the network to the first system.

13. A computer-implemented method for implementing a distributed application protocol, the method comprising:

displaying a control in a graphical user interface;

generating a first data structure for storing data and parameters received from an application residing in the server, the first data structure including database tables, procedure results from logic calls and status/error messages;

translating application requests from the application into a delimited second data structure, stored in a memory, the second data structure having an element for each of the application requests, the application requests being generated in response to user actions in a graphical user interface;

generating a stream of text-based data in an Extensible Markup Language (XML) format from the second data structure;

transmitting the stream;

receiving a response;

updating a data set object based on the response; and changing the value of the control based on the updated data set object.

14. The method of claim 13 in which the element is a class object.

15. A computer program product residing on a computer readable medium having instructions stored thereon which, when executed by the processor, cause the processor to:

display a control in a graphical user interface;

generate a first data structure for storing data and parameters related to an application residing in the server, the first data structure comprising database tables, procedure results from logic calls and status/error messages;

translate application requests from the application into a delimited second data structure stored in a memory, the second data structure comprising an element for each of the application requests, the application requests being generated in response to user actions in a graphical user interface;

generate a stream of text-based data in an Extensible Markup Language (XML) format from the second data structure;

transmit the stream;

receive a response;

update a data set object based on the response; and change the value of the control based on the updated data set object.

* * * * *